(No Model.)

R. R. SINGER.
METHOD OF AND APPARATUS FOR MANUFACTURING HOLLOW ARTICLES.

No. 507,175. Patented Oct. 24, 1893.

WITNESSES

INVENTOR
Robt R Singer (No Model.) 9 Sheets—Sheet 3.

R. R. SINGER.
METHOD OF AND APPARATUS FOR MANUFACTURING HOLLOW ARTICLES.

No. 507,175. Patented Oct. 24, 1893.

(No Model.) 9 Sheets—Sheet 5.

R. R. SINGER.
METHOD OF AND APPARATUS FOR MANUFACTURING HOLLOW ARTICLES.

No. 507,175. Patented Oct. 24, 1893.

WITNESSES
INVENTOR

(No Model.) 9 Sheets—Sheet 6.

R. R. SINGER.
METHOD OF AND APPARATUS FOR MANUFACTURING HOLLOW ARTICLES.

No. 507,175. Patented Oct. 24, 1893.

WITNESSES
INVENTOR

(No Model.) 9 Sheets—Sheet 8.
R. R. SINGER.
METHOD OF AND APPARATUS FOR MANUFACTURING HOLLOW ARTICLES.
No. 507,175. Patented Oct. 24, 1893.

(No Model.) 9 Sheets—Sheet 9.
R. R. SINGER.
METHOD OF AND APPARATUS FOR MANUFACTURING HOLLOW ARTICLES.
No. 507,175. Patented Oct. 24, 1893.

UNITED STATES PATENT OFFICE.

ROBERT R. SINGER, OF PITTSBURG, PENNSYLVANIA.

METHOD OF AND APPARATUS FOR MANUFACTURING HOLLOW ARTICLES.

SPECIFICATION forming part of Letters Patent No. 507,175, dated October 24, 1893.

Application filed January 28, 1893. Serial No. 460,067. (No model.)

*To all whom it may concern:*

Be it known that I, ROBERT R. SINGER, of Pittsburg, in the county of Allegheny and State of Pennsylvania, have invented a new and useful Improvement in Methods of and Apparatus for the Manufacture of Hollow Articles, of which the following is a full, clear, and exact description, reference being had to the accompanying drawings, forming part of this specification, in which—

Fig. 41 is a detail hereinafter referred to.

Like symbols of reference indicate like parts in each figure.

My invention relates to a method and apparatus for the manufacture of hollow articles such as vehicle tongues, whiffletrees, &c., and is an improvement upon the subject matter of my prior patent, No. 469,952, granted to me on March 1, 1892.

The method claimed by me in the present application consists in making a hollow article, such as a vehicle tongue, by clamping a sheet-metal blank, bending it into the form of a wide trough, and then, without unclamping it, bending within the blank a narrower trough, and, if desired, continuing this process until the desired form is reached.

The application claimed by me consists of a female die and a male die, either or both of which is provided with means for clamping the blank to be operated upon.

It also consists in the above combination in which the female die has two cavities, one a wide cavity for the first shaping of the blank, and the other a cavity formed within the first for the final shaping; and in such combination, wherein the male or female dies or both are made in two parts adjustable toward or from each other, and in certain other features of construction hereinafter more fully described and set forth in the claims.

In the drawings, 2 represents the posts of the machine, and 3 the upper hollow platen rigidly joined to the cross pieces 4 secured to said posts. Within the cavity of this upper platen moves the inner platen 5, to the lower flange of which is secured the clamping and shaping die 6. On the inner faces of the outer platen are guides for the inner platen, whose upper and lower flanges are enlarged for the purpose of strength and to form heads moving within the cavity. The inner platen projects endwise through the outer one, and to its protruding ends 7 are secured cross-heads 8 provided with depending guide-rods 9 secured to similar cross-heads 10 carrying cylinder 17, upon the upper ends of whose plungers 18 rest the ends of the lower inner platen 11, which is similarly guided within an outer platen 12. The lower outer platen 12 is secured to the cross-heads 13, having end collars 14 surrounding the posts 2, these cross-heads resting upon caps which fit into the plungers 15 of hydraulic cylinders 16. Each set of cylinders is connected by pipes 19 and 20 to cause them to act simultaneously and prevent the least canting action of the lower platen, and to effect a parallel motion thereof I provide the pinions 21 upon the shaft 22, which shaft is supported by the hangers 23 upon the platen. These pinions engage stationary racks upon the cylinders or framework, and it is evident that if one end tended to rise more rapidly than the other, the motion being communicated through the shaft 22 would at once equalize the upward motion. To secure the same result with the upper inner platen I pivot to the cross-heads 8 the links 24 which engage cranks 25 upon the common shaft 26, these links being made adjustable by the right and left hand screw-thread connection shown in Fig. 1.

Figure 1:
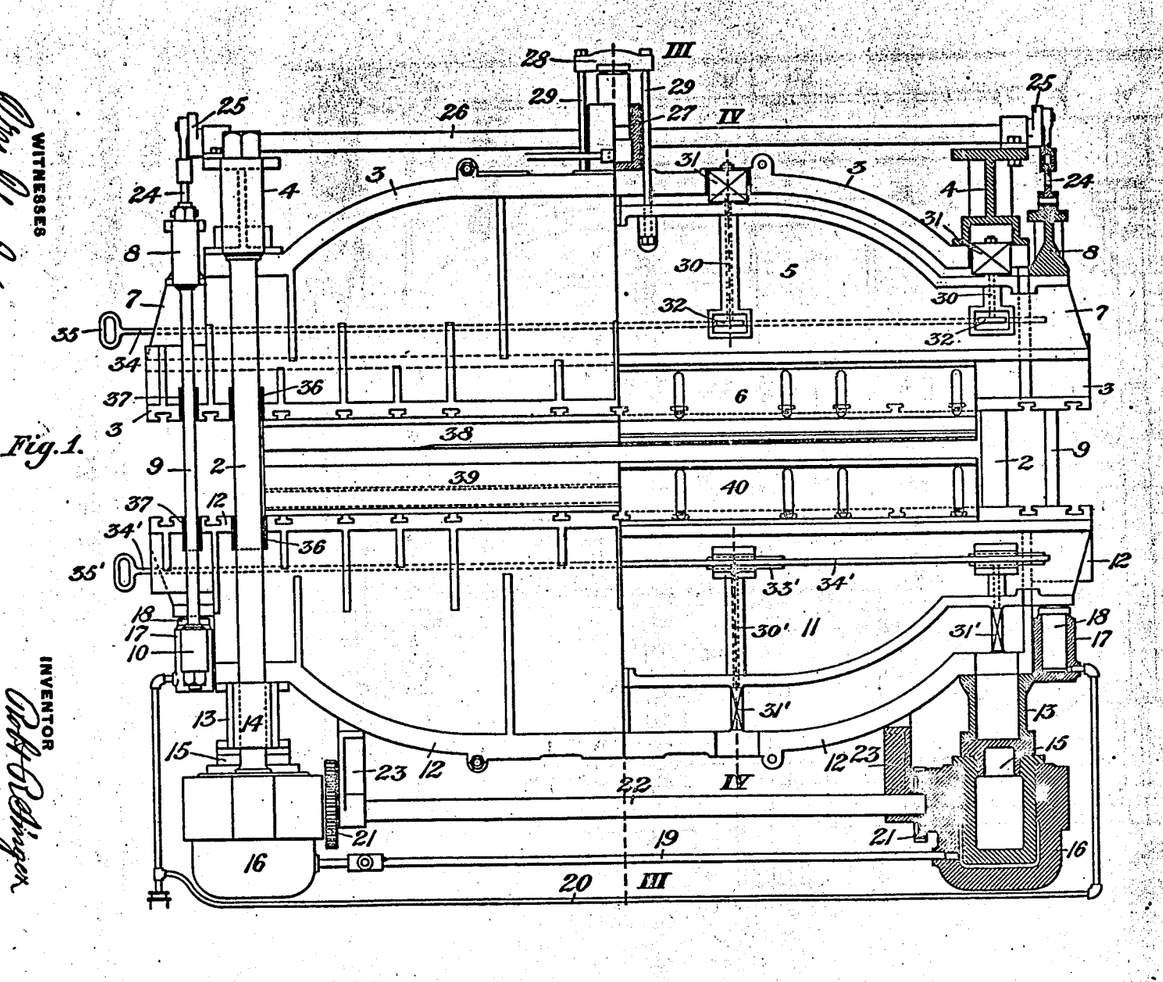
Figure 1 is a side elevation of a machine constructed in accordance with my invention.
Figure 2:
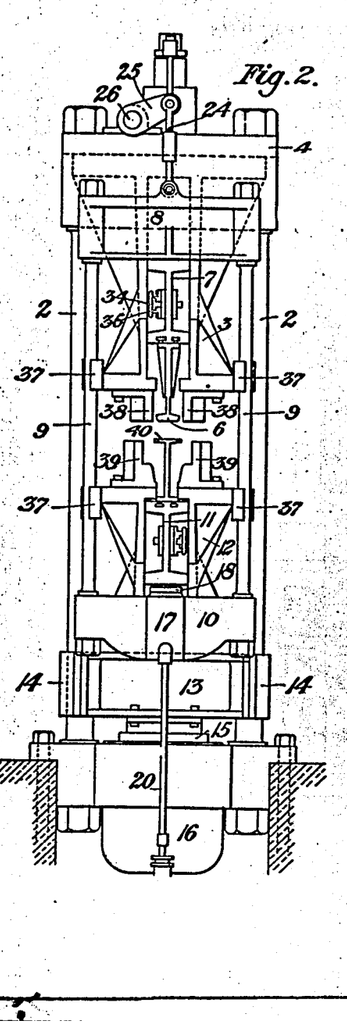
Fig. 2 is an end elevation.

To raise the inner platen 5 and its attachments, I provide the hydraulic cylinder 27, whose plunger contacts with the cross-head 28, having the depending rods 29 secured to the platen 5. To lock the platen 5 in its lower position and prevent its being pushed upwardly within the outer platen, I provide within the platen 5 the vertical shafts 30, preferably four in number, which at their upper protruding ends carry the spools or rectangular blocks 31, and at their lower ends are secured to pinions 32 meshing with racks 33 carried in suitable guides and secured to a rod 34 which projects beyond the platen at one end and is provided with a handle 35. When the spools are turned into the plane of the rods, as shown in Fig. 1, the inner platen may be raised, the spools passing within slots in the outer platen as shown. When, however, the platen 5 is lowered by releasing the fluid from the cylinder 27 and the spools are turned at right angles, they then prevent upward movement by butting against the flanges of the outer platen at the sides of the slot. An exactly similar arrangement is employed for the lower platens, and I have used therein the same numerals, differentiated from the first by the prime (') mark.

To both outer platens are secured the guide-plates 36 which contact with the posts 2, and these platens are also provided with guides 37, in contact with which the rods 9 move. The upper outer platen is provided with the half male dies 38, between which works the inner die 6, and to the lower outer platen are secured the half female dies 39, between which reciprocates the inner clamping die 40 secured to the inner platen 11. Both inner and outer dies are rendered adjustable by bolts taken into T-shaped slots in the platens, as shown in Figs. 1 and 6.

Figure 14:
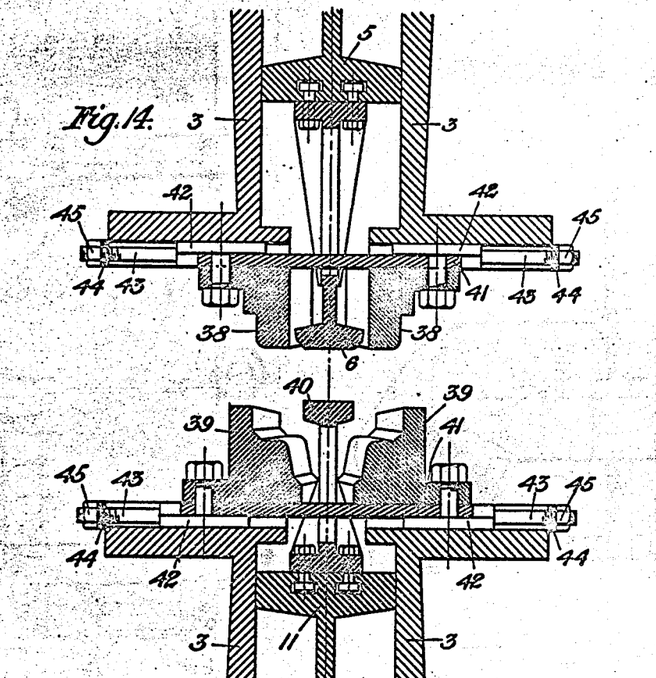
Fig. 14 is an enlarged cross-section of the dies, showing also the holder for aligning the outer dies.
Figures 15, 16:
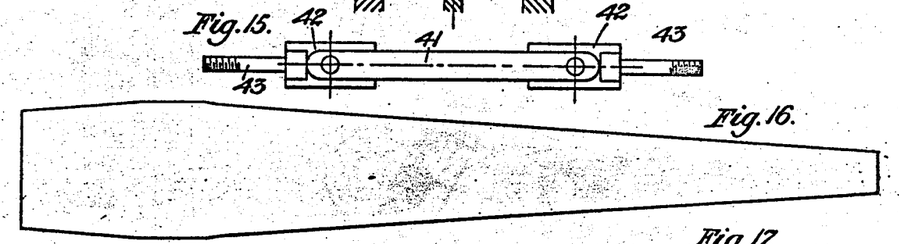
Fig. 15 is a plan view of the holder.
Fig. 16 is a plan view of a blank for a vehicle tongue.
Figures 17, 18:
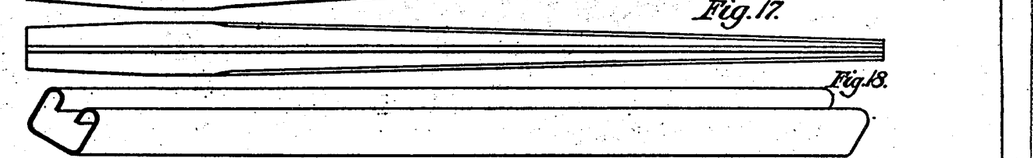
Fig. 17 showing the tongue for the uniting of its edges.
Figs. 18 and 19 are perspective views of a trolley track and electrical conduit formed upon my machine.
Figure 19:
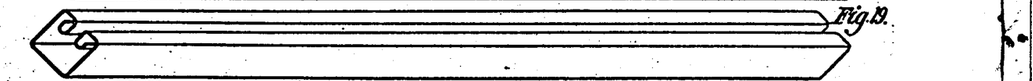
Figure 20:
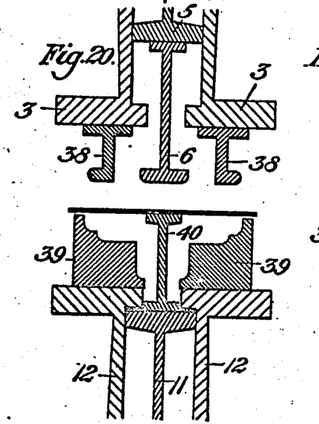
Figs. 20 to 26, inclusive, illustrate a modification of my machine, wherein the upper dies are movable toward or from each other, showing the formation of a trolley track.
Figure 21:
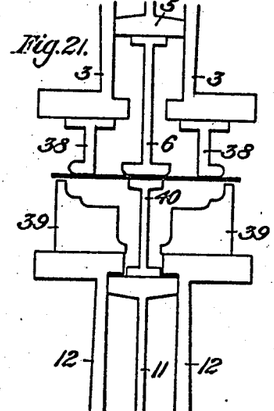

In Figs. 14 and 15, I show means for preventing any slipping of the dies and for holding them to the platen, consisting of a link-bar 41 surrounding the vertical screw-threaded stems of the plate 42 which also pass through holes in the outer dies and are provided with nuts to secure them to the platens, thus preventing any movement relative to each other, this bar being secured to guides 42 having screw-threaded stems 43, which pass through strips 44 rigid with the platen, and are provided with nuts 45, thus preventing side movements of the united dies.

Having described my machine, I will now describe the preferred mode of operating the same in making tubular articles, referring in such description to Figs. 8 to 13 inclusive.

Figure 9:
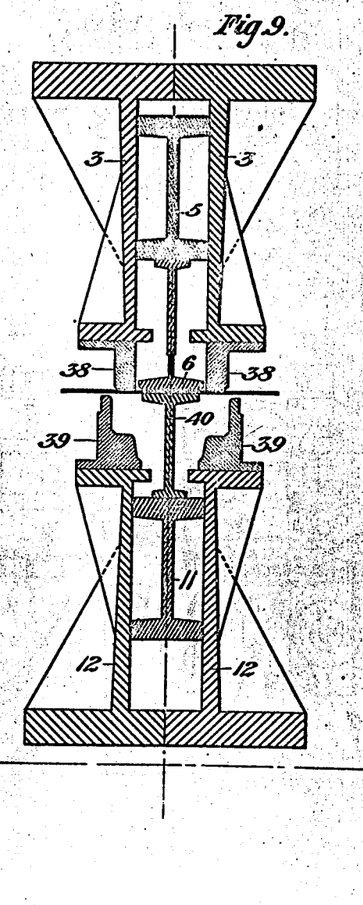
Figure 10:
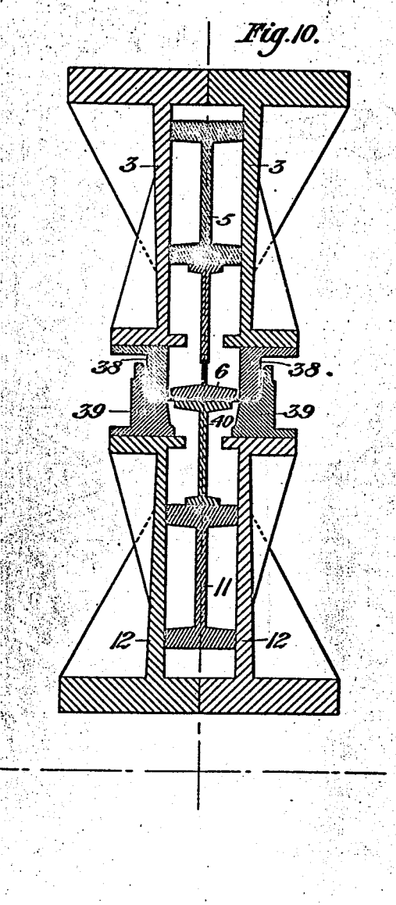
Figure 11:
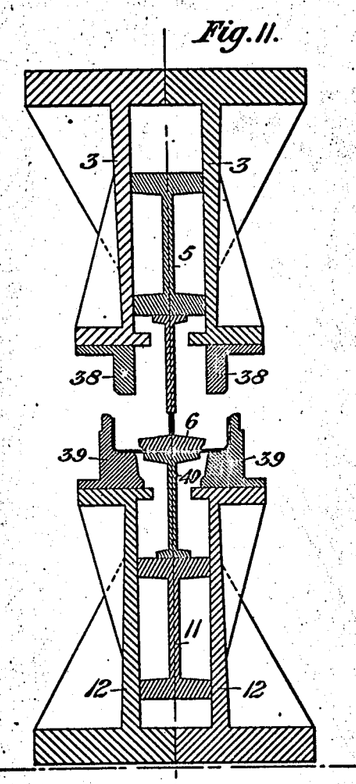
Figure 12:
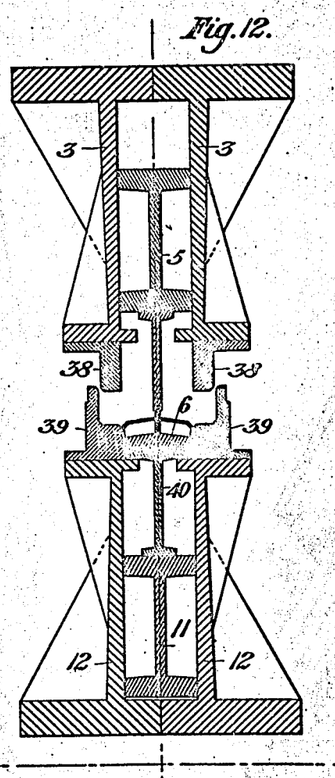
Figure 13:
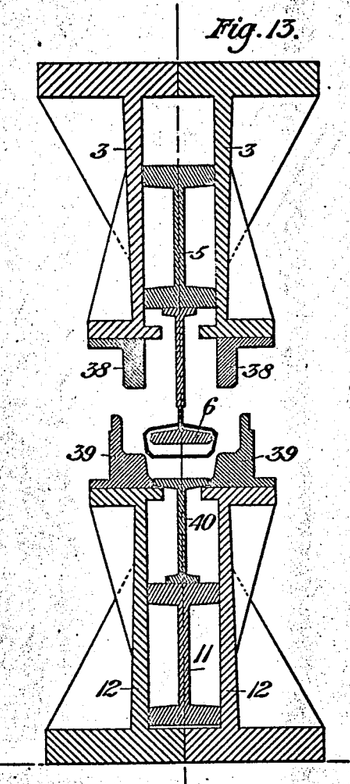

I first place the parts in the position of Fig. 1, the inner die 40 being locked by the spools 31', and the upper die 6 with its attachments being lifted by the cylinder 27. Then having placed the blank shown in Fig. 6 upon the die 40, I admit fluid to the large cylinders 16, thus raising both lower platens, and by admitting fluid to the smaller cylinders 17 I clamp the blank between the inner dies, (Fig. 9.) I then turn the spools 31', having first lowered the outer platen slightly so as not to bind it, thus unlocking the inner lower die, and force the outer platen 12 up still farther, causing the female dies to pass over the male dies and for a wide trough, (Fig 10.) I then release the fluid from the cylinder 27, and by releasing the fluid from the cylinders 16, lower both lower platens and the upper inner platen, (Fig. 11.) Then locking the inner die 6 with its attachments by the spools 31, I raise the outer female dies, bending the second inner trough, and causing the edges to approach each other, thus forming the tongue or other article, as in Fig. 12. I then lower both the female dies and the inner clamping die 40, leaving the article hanging upon the dies 6 from which it may be drawn lengthwise.

Figure 22:
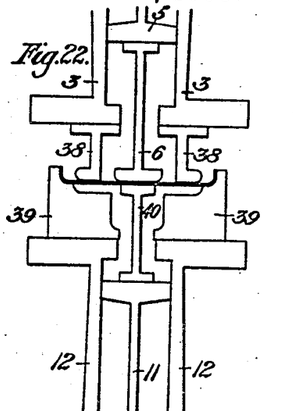
Figure 23:
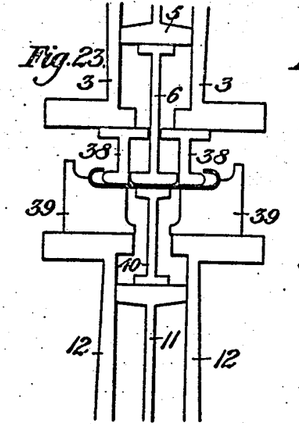
Figure 24:
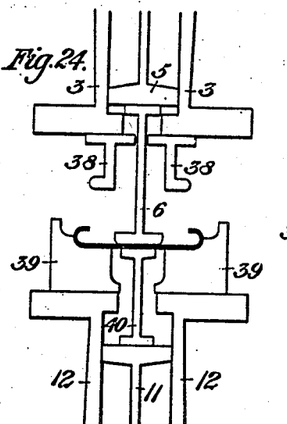
Figure 25:
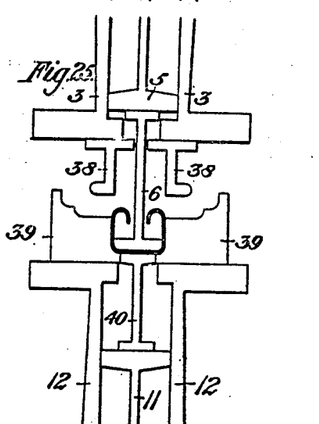
Figure 26:
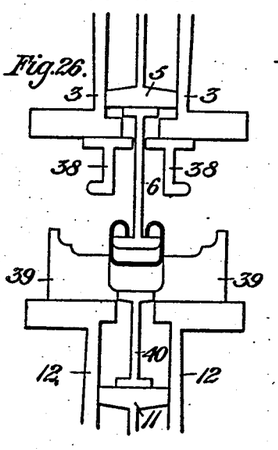

In Figs. 20 to 26 inclusive, I illustrate the operation of a machine wherein movable male dies are employed. In this case, the blank is clamped as before and bent into a wide trough, (Fig. 22.) The outer male dies are then moved toward each other, and the second trough formed, (Fig. 23.) The female dies and the upper inner die then being dropped (Fig. 24), the female outer dies are raised, (Fig. 25,) bending the article into the trolley-track form, and the outer female dies and inner lower clamping die are then dropped, leaving the article upon the inner upper die, (Fig. 26.)

Figure 27:
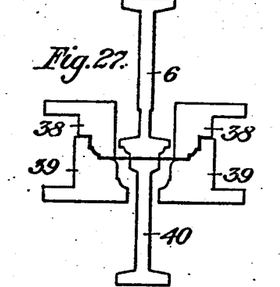
Figs. 27 and 28 show the formation of a hand-rail, where the dies do not move toward or from each other.
Figure 28:
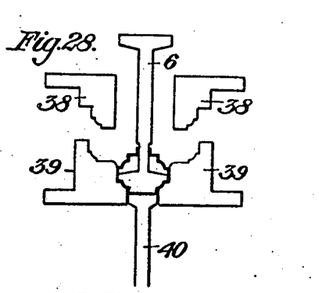
Figure 29:
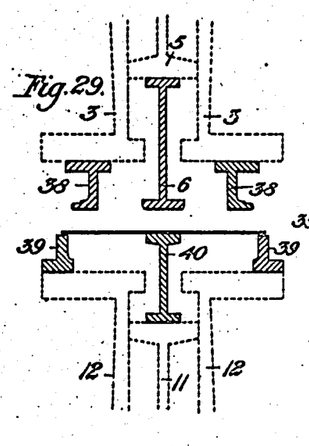
Figs. 29 to 37, inclusive, show a second modification, wherein both upper and lower outer pairs of dies are movable back and forth, the formation of an electrical conduit being illustrated.
Figure 30:
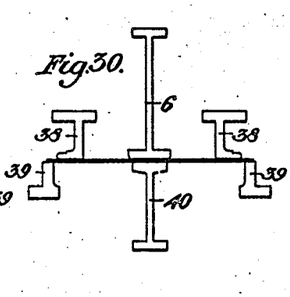
Figure 31:
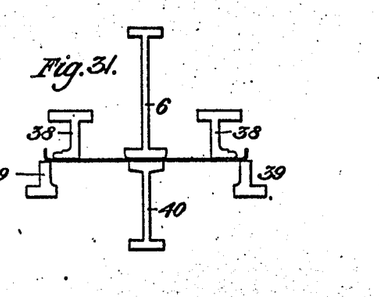
Figure 32:
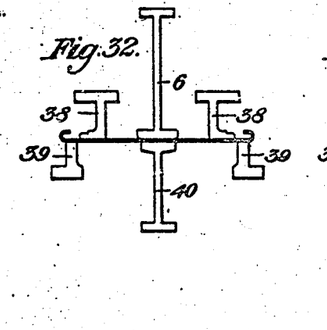
Figure 33:
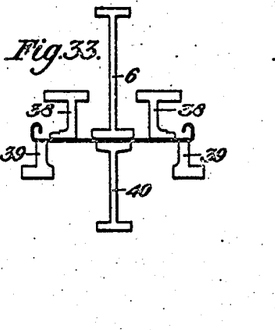
Figure 34:
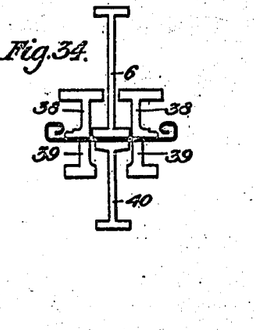
Figure 35:
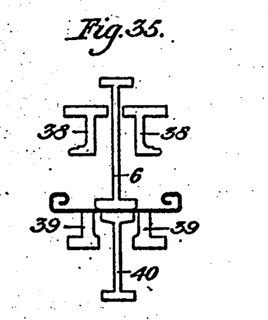
Figure 36:
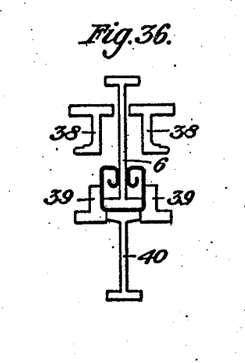
Figure 37:
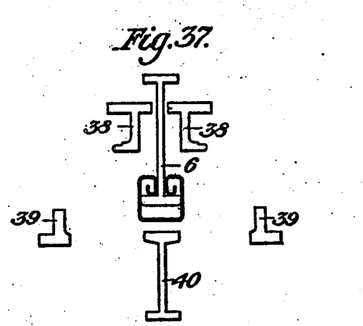
Figure 38:
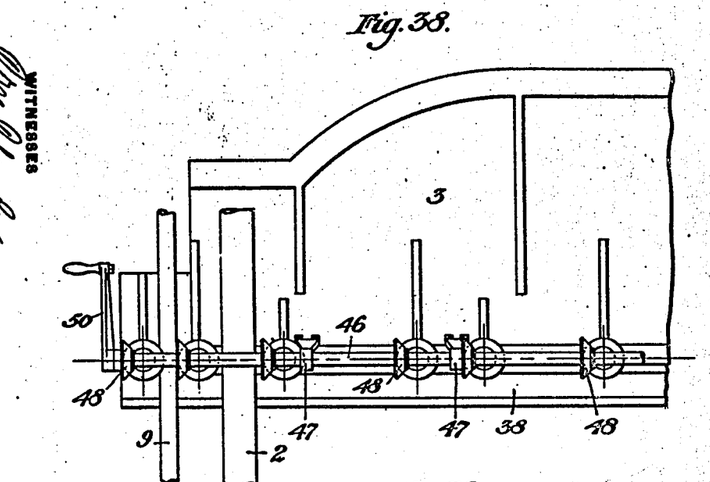
Fig. 38 is a partial side elevation of the upper platen, showing the means for moving the outer dies.
Figure 39:
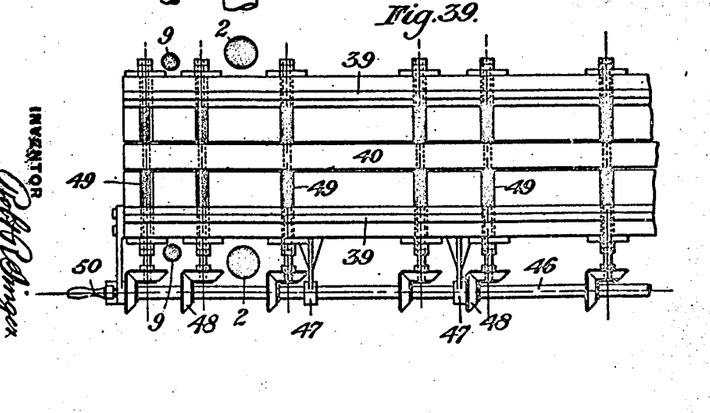
Fig. 39 is a plan view of the lower dies provided with similar means.

In Figs. 27 and 28 I illustrate the formation of a hand-rail by my machine, Fig. 27 showing the first, and Fig. 28 the second step, and in this case the upper and lower sets of outer dies do not move laterally during the stamping.

In Figs. 29 to 37 inclusive, I illustrate the operation of forming an electric conduit, both parts of the male and female dies being movable toward and from each other. The sheet is first clamped, as in Fig. 30, the female dies raised and then lowered and both dies moved as in Fig. 31, and the same operation repeated as in Figs. 32, 33 and 34. The female dies and the upper inner die are then lowered, as in Fig. 35, and the female dies being moved upwardly bend the final form of Fig. 36, the lower dies then being dropped, leaving the conduit hanging upon the upper inner die, whence it is drawn off.

Figure 40:
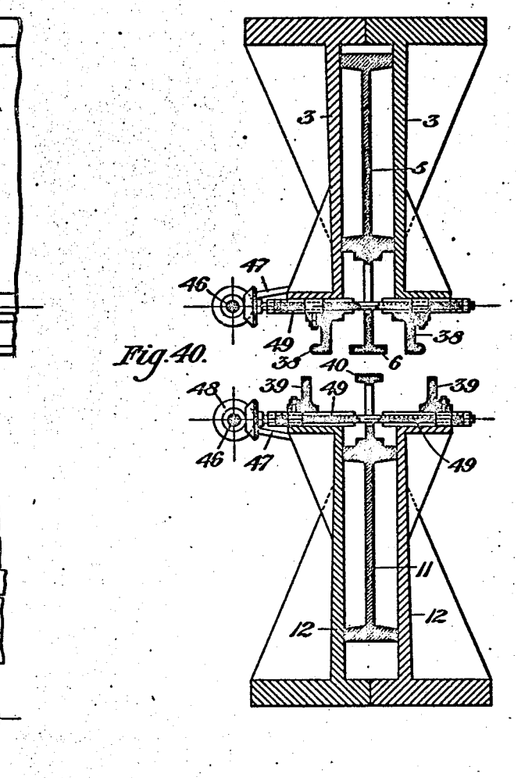
Fig. 40 is a cross-section through the upper and lower dies of the machine of Figs. 38 and 39.

To move either the male or female dies in or out, I provide a shaft 46 hung in collars 47 supported along one side of the outer platen, this shaft being provided with a suitable number of bevel wheels 48 which intermesh with bevel wheels upon short shafts 49, which are provided with right and left hand screw threads passing through similarly threaded apertures in guides beneath the dies. The inner dies are suitably slotted as shown in Fig. 40, to allow passage of the short shafts or the link bar, respectively, and when the shaft is rotated by the handle 50, it is evident that the dies will be moved in or out according to the direction of rotation of the shaft. Screws or other means for raising and lowering and also clamping the blank may take the place of the cylinders 17.

Other means than the spools shown may be used for locking the inner dies, and with the spools shown I may, by changing the spools, regulate the point at which the inner dies are held.

Figure 3:
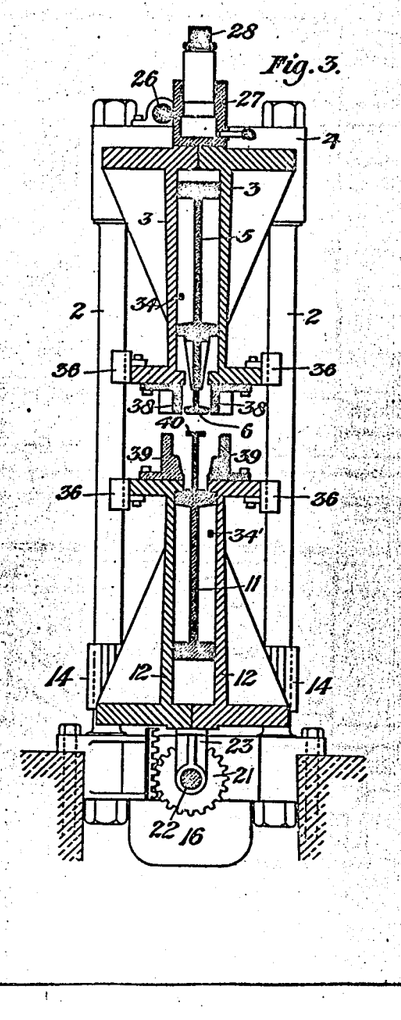
Fig. 3 is a vertical cross section on the line III—III of Fig. 1.
Figure 4:
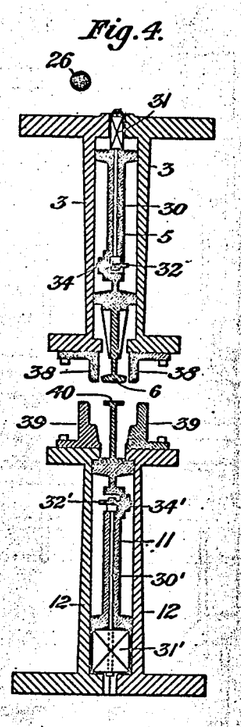
Fig. 4 is a similar view on the line IV—IV of Fig. 1.
Figures 4, 5, 6:
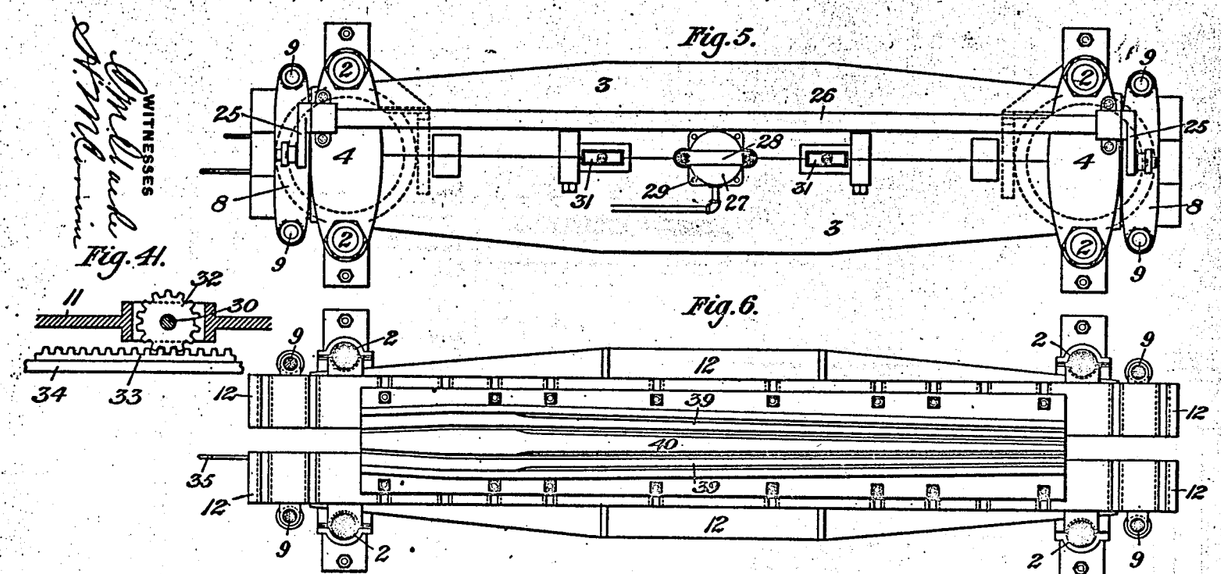
Fig. 5 is a top plan view.
Fig. 6 is a horizontal section, showing the lower dies.
Figure 7:
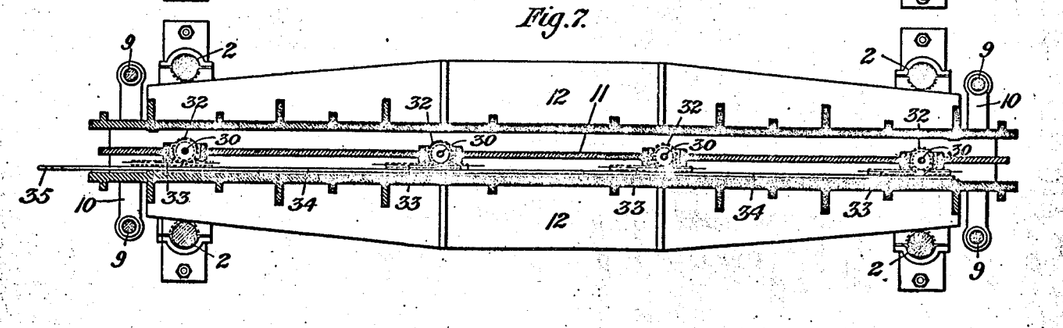
Fig. 7 is a horizontal section below the lower dies.
Figure 8:
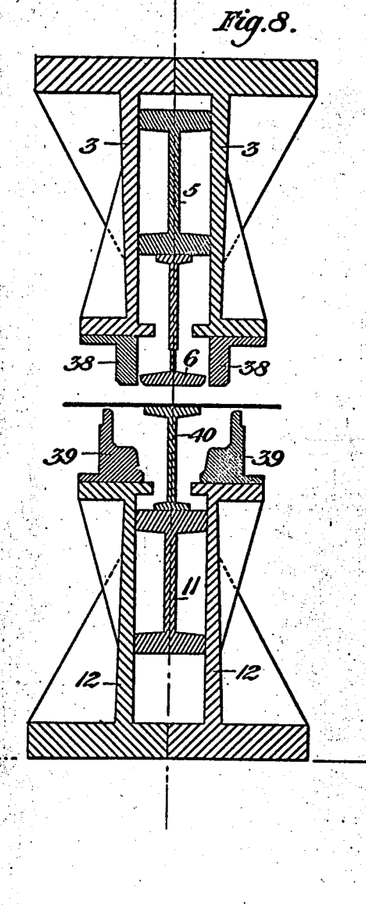
Figs. 8 to 13, inclusive, are vertical cross sections of the dies in their successive positions.

I prefer to use dies having the sharp corners rounded as shown in Figs. 3 and 4, to permit of easy binding and prevent any shearing of the blank as it is bent thereover, but this as well as many other features of my invention may be varied without departure from my invention.

I claim—

1. The method of making vehicle tongues and other hollow articles, which consists in clamping a sheet metal blank, bending the blank into the form of a wide trough, and, while it is still clamped, bending a narrower trough therein; substantially as described.

2. The method of making vehicle tongues and other hollow articles, which consists in clamping a sheet-metal blank, bending it into the form of a wide trough and while it is still clamped bending narrower troughs therein until the desired article is formed; substantially as described.

3. In apparatus for making vehicle tongues and other hollow articles, a female die having two cavities, one within the other, viz., a wider cavity and an inner narrower cavity, in combination with shaping-dies and a clamping-die; substantially as described.

4. In apparatus for making vehicle tongues and other hollow articles, the combination of vertically moving male and female dies, vertically moving clamping and shaping dies situate within and working independent of, and between the separated portion of the first named dies; substantially as described.

5. In apparatus for making vehicle tongues and other hollow articles, the combination of a female die, a male die, both of the dies being formed in separated parts, independently movable dies situate between the separated parts of the first dies, and means for adjusting the separated parts of either of the dies from and toward each other; substantially as described.

6. In apparatus for making vehicle tongues and other hollow articles, the combination of a female die composed of two separated portions independently adjustable toward and from each other, and a male die arranged to enter the female die and also having two similar adjustable portions; substantially as described.

7. In apparatus for making vehicle tongues and other hollow articles, the combination with a pair of half dies and an intermediate die movable between the same, of a clamping-die connected with the intermediate die, and means for actuating the clamping-die independently of the intermediate die; substantially as described.

8. In apparatus for making vehicle tongues and other hollow articles, the combination of a platen carrying a pair of half dies, an intermediate die movable within the same, a clamping-die resting upon cross-heads connected with the intermediate die, and means located upon said cross-heads for moving the clamping die; substantially as described.

9. In apparatus for making vehicle tongues and other hollow articles, the combination with a pair of half dies, of an intermediate die movable within the same, and means for locking the intermediate die from backward movement relatively to the half dies; substantially as described.

In testimony whereof I have hereunto set my hand.

ROBT. R. SINGER.

Witnesses:
H. M. CORWIN,
W. B. CORWIN.